Sept. 2, 1941.  F. L. DARLING  2,254,935
CASTER WHEEL CONTROL FOR AIRPLANES
Filed June 26, 1939
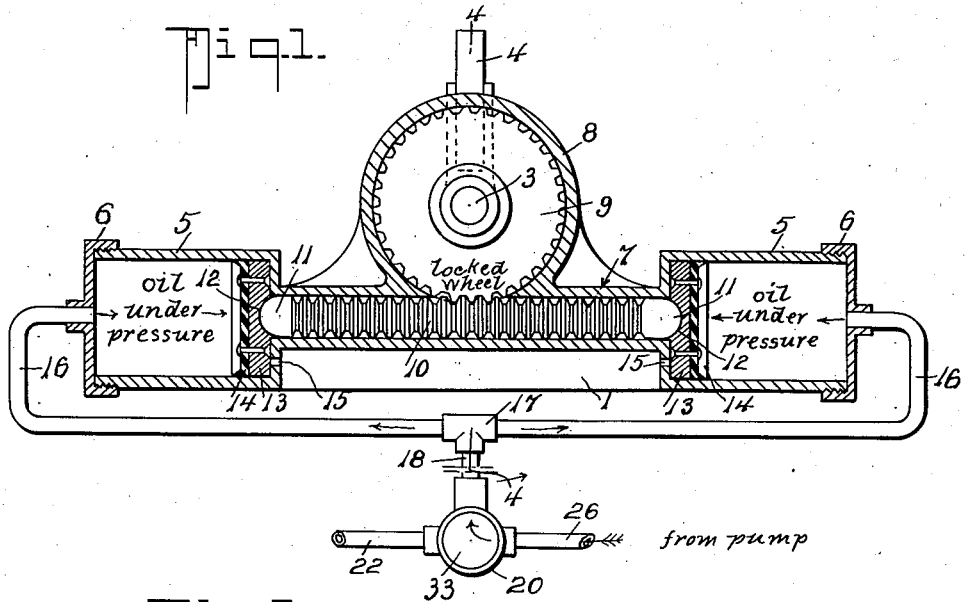
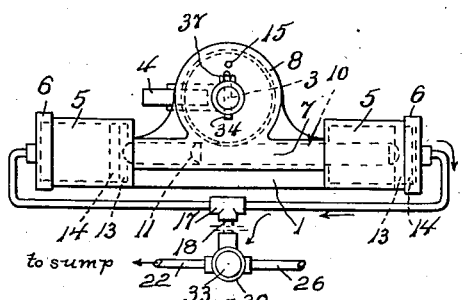
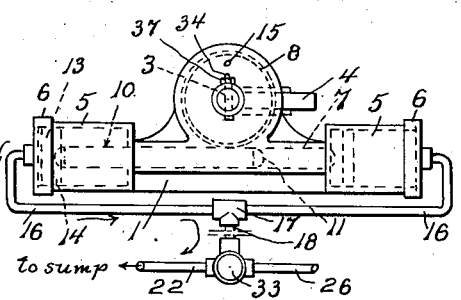
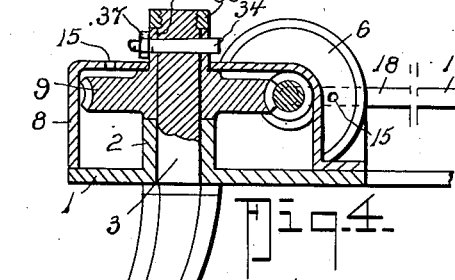
Frank L. Darling
By Dieterich & Rutley
Attorneys Patented Sept. 2, 1941

2,254,935

UNITED STATES PATENT OFFICE 2,254,935

CASTER WHEEL CONTROL FOR AIRPLANES

Frank L. Darling, Hollywood, Calif., assignor to Wagner Electric Corporation, St. Louis, Mo., a corporation of Delaware Application June 26, 1939, Serial No. 281,304

9 Claims. (Cl. 244—1)

My invention relates to certain new and useful improvements in airplanes and especially in the means for holding the caster wheel in the longitudinal plane of the craft in taking off.

The caster wheel is usually pivoted on or swings about an axis approximately normal to the ground line, in order to permit easy handling of the craft on the ground. If the caster wheel be left free to swivel at all times, it has been found to give rise to objectionable yawing. This is particularly objectionable when the craft is taxiing along the runway prior to the take-off from the ground.

In the attempts to remedy the defects of a free caster wheel, several expedients have heretofore been proposed, among which are the employment of spring members adapted to return the wheel to its normal central position, or the employment of latch pins to latch the wheel in its centered position, which pins are under control of the pilot through wire or other suitable connections running from the pilot's place of location in the plane to the caster wheel, the pins usually being mounted at fixed places and dropping into recesses in a plate or wheel fixed to the caster wheel spindle. These pins are designed to shear off if the caster wheel meets with sufficient resistance against swivelling and the pilot fails to withdraw the pins in time. Both the foregoing efforts to remedy the defects of a loose or free caster wheel are open to serious objections and have not proven satisfactory or safe in practice.

The use of spring devices which serve to center the wheel retard its free action when such action is most desirable, as for instance, in turning the craft on the ground; while with the use of the shear-pins the pilot must wiggle the tail of his plane until the pins register with their receiving recesses and drop into place and, furthermore, the pins shear off, in which case they must be replaced with new ones, which causes delay.

The ideal condition for a caster wheel is to leave it normally free to turn through an arc of, say, 180 degrees or more, and to lock it in its central or straight-way position only while the pilot desires it, the "lock" becoming automatically released otherwise.

My invention therefore has for an object to provide a mechanism of a simple and effective construction which will not only be free of the objectionable features of past devices for the purpose but which will fulfill the ideal conditions above noted.

Other objects will in part be obvious and in part be pointed out hereinafter.

To the attainment of the aforesaid objects and ends the invention still further resides in those novel features of construction, combination and arrangement of parts, all of which will be first fully described in the following detailed description and then be particularly pointed out in the appended claims, reference being had to the accompanying drawing, in which:

Fig. 1 is a horizontal sectional view of one embodiment of the invention, the caster wheel being in the locked position.

Fig. 2 is a top plan view of the same, the caster wheel being free and turned 90 degrees to one side.

Fig. 3 is a view similar to Fig. 2, with the wheel turned 180 degrees from the position of Fig. 2.

Fig. 4 is a detail section on the line 4—4 of Fig. 1.

Fig. 5 is a detail vertical section of one form of control valve that may be used, the valve being in the normal position (wheel free).

In the drawing, in which like numbers of reference indicate like parts in all the figures, I is the part of the plane which carries the bearing 2 for the spindle 3 of the caster wheel 4. This part I may be a fixed part of the chassis or, when retractable caster wheels are used, it may be a part of the swinging mount.

The spindle 3 extends up through the hub 35 of a gear 9 to which it is keyed, preferably by a removable key 34, for a reason presently to be explained.

The gear 9 is located in a suitable case 8, which is also provided with a housing and rack guide 7, at the ends of which the hydraulic cylinders 5 are located.

The cylinders 5 have removable caps 6 having suitable ported bosses to which the ends of the duct 16 are connected.

In the cylinders are floating pistons 13 having suitable cup packings 14 and having semispherical seats 12 for the semi-spherical ends 11 of the rack rod 10 which is free to move longitudinally and to turn about its axis so as freely to mesh with gear 9. The case 8 is provided with a suitable vent or breathing opening 15, as indicated in Figs. 2, 3 and 4.

The duct 16 has a T 17 to which a duct 18 from the control valve is connected.

A control valve of suitable construction is shown in Fig. 5, by reference to which it will be seen that the valve casing 20 has a pair of oppositely disposed ports 19 and 21. The duct 18 connects to port 19, while a duct 22 leads from port 21 to a sump (not shown). The casing also has a pair of oppositely disposed ports 24 and 25, the port 24 connecting through a duct 23 with the duct 18, while port 25 is connected via duct 26 to a hydraulic pump (not shown) which pumps the fluid from the sump and forces it to the cylinders 5 when the valve is pushed in.

The valve proper comprises a body of three sections 28, 29 and 30. The sections are connected by necks 31, thereby leaving annular ports lining up with the respective pairs of ducts 19, 21 and 24, 25. It also has a stem 32 that carries a pushbutton or head 33. A spring 34 keeps the valve normally in the position where ports 19 and 21 remain in communication while port 24 is closed off from port 25.

A suitable nut 36, or its equivalent, serves to hold the caster wheel from dropping off when key 34 is out; key 34 may be provided with suitable means, for example a nut 37, to hold it against accidentally coming out.

Operation

The valve is located at a place where the pilot or assistant pilot can operate it either by hand or foot, as desired.

Normally the control valve places cylinders 5 in communication with the sump so no oil is under pressure in the cylinders. Therefore, should the plane, in taxiing over the ground, turn to one side or the other, the caster wheel is free to accommodate itself thereto.

Assume that a turn to the left is made and wheel 4 is moved from the position of Fig. 1 to that of Fig. 2; the gear 9 will thrust rack bar 10 to the right (in Fig. 1), thereby pushing piston 13 in the right-hand cylinder outwardly without, however, moving piston 13 in the left-hand cylinder. The oil ahead of piston 13 in the right-hand cylinder then flows through valve passages 19, 20 and duct 22 to the sump. If a right turn is made, the left-hand piston is pushed out instead of the one in the right-hand cylinder, as indicated in Fig. 3.

Now when the pilot desires to bring the caster wheel back in a straight line with the ship (Fig. 1) and hold it there, he pushes in on button 33 until port 19 is cut off from port 21 and ports 24 and 25 are brought into communication.

The liquid, under pressure from the pump, is then forced via ducts 18 and 16 into the ends of both cylinders 5 and forces the pistons inwardly until both of them engage rack bar 10 and center it in its guide 7 and thereby bring wheel 4 to the straightway position of Fig. 1. It will remain under hydraulic lock so long as button 33 is held in, but when the aviator releases button 33 immediately spring 34 returns the valve parts to normal position, pressure is released from piston 13, and caster wheel 4 is free to turn within the limits (degrees) for which the apparatus is designed. If the aviator desires positively to lock the wheel hydraulically then, after fully depressing the button 33 to connect ports 24 and 25 via 31, so that the wheel may be centered and pressure built up evenly against the heads of pistons 13, he permits button 33 to rise until port 31 comes out of register with ports 24 and 25, stopping the rise however before port 31 registers with ports 19 and 21, and he holds the valve in this position. The incompressible fluid (liquid) in the cylinders 5 and ducts 16 and 18 will then be trapped and accomplish what is termed a hydraulic lock.

In backing the plane, if it be desired that the caster wheel be entirely free to swivel through 360 degrees or more, I have made provision for this in the removable key 34, which key 34 may be driven out, whereupon gear 9 becomes disconnected from spindle 3 and the spindle can swivel freely.

While I have disclosed but one practical embodiment of my invention, it will be obvious to those familiar with the art that various changes in the design, proportions and details of construction can be made without departing from the spirit of the invention within the scope of the appended claims.

Attention is called to the fact that by the use of free or floating pistons and a floating rack bar, all danger of pumping air into the oil lines is avoided. For instance, let us assume that the wheel 4 is swivelling first to one side and then to the other; then first one piston will be forced outwardly and then the other one will be forced outwardly. Hence the oil in both cylinders will be forced to the sump. (The outlet end of the pipe 22 in the sump, of course, is always located below the oil level.) Any further reciprocation of the rack bar by the movement of the wheel 4 about its spindle 3 will not affect the position of the pistons 13.

From the foregoing description, taken in connection with the accompanying drawing, it is thought that the complete construction, operation and advantages of the invention will be clear to those skilled in the art to which it relates.

What I claim is:

1. In an airplane having a caster wheel, the combination with said wheel of means for hydraulically locking said wheel against swivelling on its spindle axis, and means normally holding said wheel free to swivel about its spindle axis, said means including operating pistons in cylinders and a control valve device having fluid exhausting and admission ports and a valve for said ports for the purpose of either delivering liquid under pressure to said cylinders or exhausting liquid therefrom, or trapping the liquid in said cylinders accordingly as said valve is in one position or another, by virtue of which said wheel may be left free to swivel, be held under hydraulic pump pressure, or be hydraulically locked, at the will of the aviator.

2. In an airplane having a caster wheel with a spindle mounted in a bearing in a suitable support, the combination with the aforesaid structure, of a gear connected to and turning with said spindle, a reciprocable rack bar, a casing having a guide for said bar and maintaining the bar in mesh with said gear, hydraulic cylinders with pistons acting on the ends of said bar to move it lengthwise, and means to admit hydraulic fluid to both cylinders simultaneously to center said bar and hold said caster wheel centered, said pistons being free of the rack bar so as to float in the cylinders.

3. In an airplane having a caster wheel with a spindle mounted in a bearing in a suitable support, the combination with the aforesaid structure, of a gear connected to and turning with said spindle, a reciprocable rack bar, a casing having a guide for said bar and maintaining the bar in mesh with said gear, hydraulic cylinders with pistons acting on the ends of said bar to move it lengthwise, and means to admit hydraulic fluid to both cylinders simultaneously to center said bar and hold said caster wheel centered, said pistons being free of the rack bar so as to float in the cylinders, said rack bar having semi-spherical ends and said pistons having corresponding seats to receive said ends.

4. In an airplane having a caster wheel with a spindle mounted in a bearing in a suitable support, the combination with the aforesaid structure, of a gear connected to and turning with said spindle, a reciprocable rack bar, a casing having a guide for said bar and maintaining the bar in mesh with said gear, hydraulic cylinders with pistons acting on the ends of said bar to move it lengthwise, and means to admit hydraulic fluid to both cylinders simultaneously to center said bar and hold said caster wheel centered, said pistons being free of the rack bar so as to float in the cylinders, said rack bar being free to turn on its axis.

5. In an airplane having a caster wheel with a spindle mounted in a bearing in a suitable support, the combination with the aforesaid structure, of a gear connected to and turning with said spindle, a reciprocable rack bar, a casing having a guide for said bar and maintaining the bar in mesh with said gear, hydraulic cylinders with pistons acting on the ends of said bar to move it lengthwise, and means to admit hydraulic fluid to both cylinders simultaneously to center said bar and hold said caster wheel centered, said pistons being free of the rack bar so as to float in the cylinders, said rack bar having semi-spherical ends and said pistons having corresponding seats to receive said ends, said rack bar being free to turn on its axis.

6. In apparatus of the class described, a support having a spindle bearing, a caster wheel spindle mounted in said bearing and carrying a caster wheel, a gear wheel secured on said spindle, a rack bar, a rack-bar guide with cylinders at each end thereof, a floating piston in each cylinder at the ends of said rack bar, means for leading fluid into the outer ends of said cylinder to impel said pistons inwardly toward each other and thereby center said rack bar, and means to exhaust fluid from said cylinders to free said rack bar and pistons.

7. In apparatus of the class described, a support having a spindle bearing, a caster wheel spindle mounted in said bearing and carrying a caster wheel, a gear wheel keyed to said spindle, a rack bar, a rack-bar guide with cylinders at each end thereof, a piston in each cylinder at the ends of said rack bar, means for leading fluid into the outer ends of said cylinder to impel said pistons inwardly toward each other and thereby center said rack bar, and means to exhaust fluid from said cylinders to free said rack bar and pistons.

8. In an airplane having a caster wheel, the combination with said wheel of means for hydraulically locking said wheel against swivelling on its spindle axis and normally holding said wheel free to swivel about its spindle axis, said means including operating pistons in cylinders and a control valve device having fluid exhausting and admission ports and a valve for said ports for the purpose of either delivering liquid under pressure to said cylinders or exhausting liquid therefrom, or trapping the liquid in said cylinders accordingly as said valve is in one position or another, by virtue of which said wheel may be left free to swivel, be held under hydraulic pump pressure, or be hydraulically locked, at the will of the aviator.

9. In combination with a caster wheel for an airplane having a spindle providing an axis about which the wheel is capable of turning, of fluid actuated means for moving said wheel to and holding it in a position where its plane extends longitudinally of the airplane, said means comprising cylinders on opposite sides of the axis of the spindle, pistons in said cylinders, stop means for limiting the movement of the pistons in one direction, a member connected to move in unison with the spindle, said member being separate from the pistons but capable of being abutted on opposed surfaces by portions of the pistons only when the pistons are moved to engage their respective stops, a source of fluid pressure connected to the cylinders, means for causing fluid pressure from the source to act on both pistons simultaneously to move them against their stops and maintain them in such positions to thus hold said member and the spindle from movement.

FRANK L. DARLING.